Figure 1:
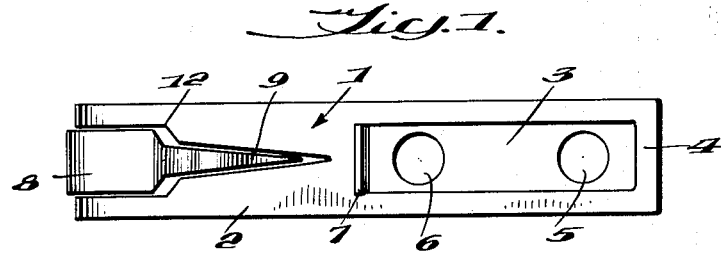

Feb. 25, 1964   L. MARKOFF-MOGHADAM   3,121,927
SAFETY CLIP

Filed Dec. 7, 1962   2 Sheets-Sheet 1

INVENTOR.
LEO MARKOFF MOGHADAM,
BY
*Jason Taylor*
ATTORNEYS

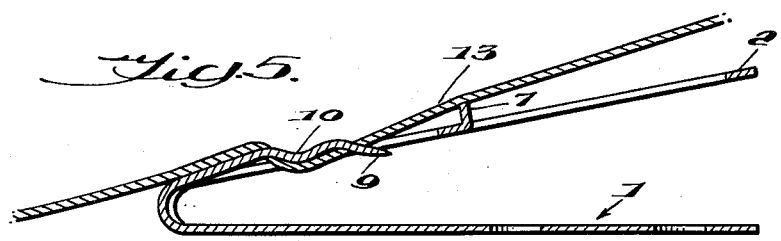
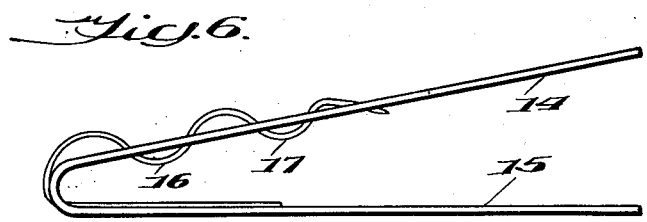
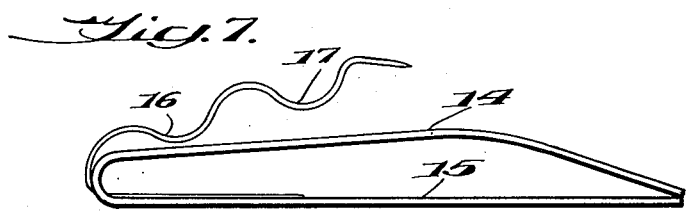
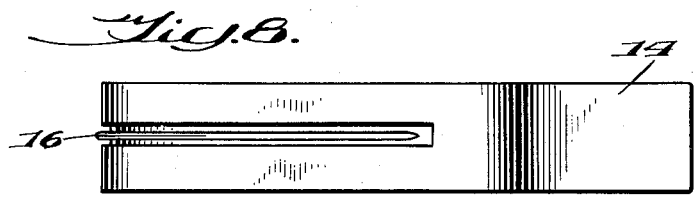
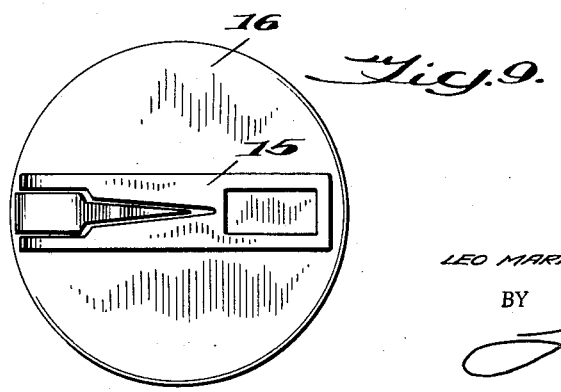

United States Patent Office 3,121,927
Patented Feb. 25, 1964

3,121,927
SAFETY CLIP
Leo Markoff-Moghadam, Washington, D.C., assignor to Uniclip, Inc., Washington, D.C., a corporation of Maryland
Filed Dec. 7, 1962, Ser. No. 243,037
1 Claim. (Cl. 24—161)

This invention relates to a safety clip of the type disclosed and claimed in my earlier application Serial No. 182,433 filed March 26, 1962, and Patent No. 3,049,770 issued August 21, 1962. The safety clip disclosed in the above referred to prior application combines the ease of fastening of an ordinary straight pin with the security advantages of a safety pin.

In both of these prior applications referred to above there is disclosed a clip which provides a ready means for attaching an object such as costume jewelry, badges and similar devices to a garment. The clip comprises a pair of resiliently interconnected arms with a pin formed on or secured to one arm and a slot on the other arm, the pin being adapted to extend through the slot when the arms are pressed together so that the pin is exposed and able to engage fabric or the like whereby the engaged fabric will be drawn through the slot when the arms are released. In my prior application there is disclosed cross-guard means which provide a locking means preventing the fabric from becoming disengaged from the pin unless the arms are pressed together. In the earlier applications the end portion of the slot is provided with a cross-guard which extends angularly from the arm and in the latter filed application the cross-guard comprises portions of the arm which are bent angularly upwardly adjacent the mid-portion of the slot.

According to the present invention the cross-guard providing a locking means may be eliminated and a pin bent in a particular manner may provide an equivalent locking means.

According to one embodiment of the present invention there is provided a pair of arms which are integrally formed and a pin element is formed from the metal in one of the arms thereby providing a slot in this arm within which the pin is normally disposed. The pin is provided with an upwardly opening U-shaped bend intermediate the end thereof to provide the locking means hereinbefore referred to. When the arms are pressed together the pin is exposed so that it may engage fabric or garment to which the clip is to be attached. The clip is drawn onto the fabric until that portion of the fabric engaged with the pin is disposed over the U-shaped bent portion. When the resilient arms are released the pin and fabric are drawn through the slot in the arm and by reason of the engagement of the fabric over the bent portion of the pin, the fabric is locked on the pin and cannot be released until the arms are subsequently pressed together.

An object of the present invention is to provide a clip which is adapted to be readily engageable with fabric and yet which provides means for firmly locking the fabric in engagement with the clip.

Another object of the present invention is to provide a clip having a pin portion disposed in a slot in one of a pair of resilient arms, the pin having a bent portion to provide means for locking fabric in engagement with the pin.

Figure 2:
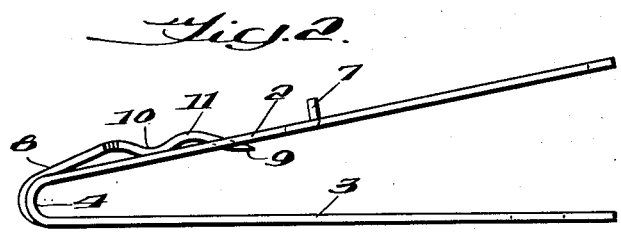
Figure 3:
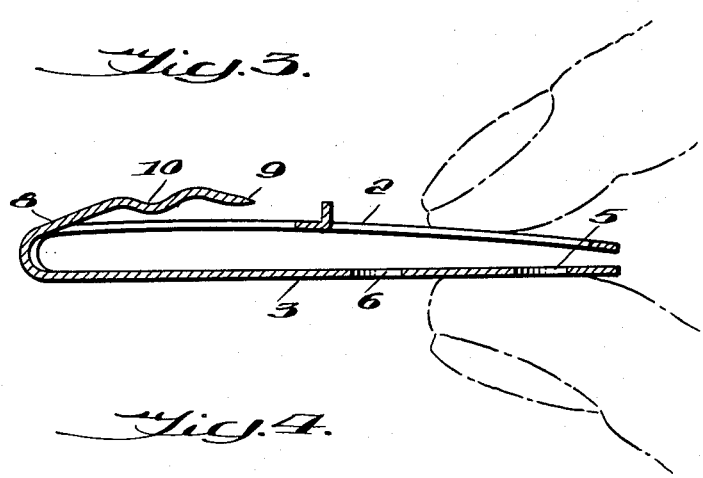
Figure 4:
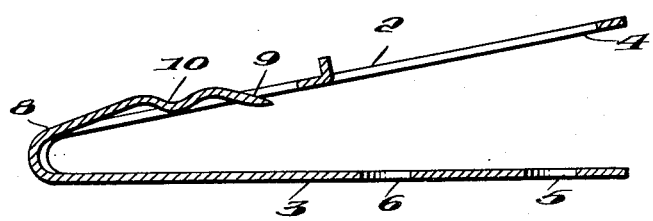

Other objects and many of the attendant advantages of the present invention will become more readily apparent in the following detailed specification when considered in connection with the accompanying drawings wherein:

FIG. 1 is a top plan view of one embodiment of a pin according to the present invention, FIG. 2 is a side elevation of the pin disclosed in FIG. 1, FIG. 3 is an elevational cross-sectional view of the pin showing the arms pressed together, FIG. 4 is a sectional side elevation showing the pin in the normal position, FIG. 5 is a view similar to FIG. 4 showing fabric in engagement with the pin, FIG. 6 is a side elevation of another embodiment of the present invention, FIG. 7 is a side elevation of the pin shown in FIG. 6 with the arms pressed together, FIG. 8 is a top plan view of the pin shown in FIGS. 6 and 7 and, FIG. 9 is a plan view showing the pin applied to a button or the like.

Referring now more specifically to the drawings wherein like numerals indicate like parts throughout the several views there is shown in FIG. 1 a clip 1 which is formed from an integral strip of resilient material such as a spring steel and comprises arms 2 and 3 which are integrally connected by U-shaped intermediate portion 4. The upper arm 2 is provided with a rectangular cut-out portion 4 to provide access to openings 5 and 6 in the arm 3. These openings provide rivet holes or screw holes as a means for attaching the clip to costume jewelry, buttons, pins, badges and the like. At the end of the rectangular cut-out 4 is a finger guard 7 which is struck upwardly and extends substantially normally with respect to the plane of arm 2.

The pin is formed from the metal of the arm 2 and comprises an enlarged base portion 8 adjacent the interconnecting portion 4 of the arms 2 and 3. The end portion of the pin is tapered to a point 9 and intermediate the end of the pin there is provided a downwardly bent portion 10 which forms an upwardly opening generally U configuration and a downwardly bent portion 11 which is disposed adjacent thereto.

It can be seen that a slot 12 is formed in the arm 2 when the pin is cut from the material of the arm 2. The entire clip can be made in a stamping operation from an integral strip of metal. The pin is struck from the metal, the openings 5 and 6 and cut-out 4 are formed and the pin is subsequently bent to the U-shaped configuration shown.

When the arms 2 and 3 are brought together as shown in FIG. 3 the pin is exposed so that it can engage fabric to which the pin is to be attached. The fabric is drawn over the end portion of the pin 9 until it is firmly seated under the inner arm of the U-shaped bend 10 and upon subsequent release of the arms the fabric 13 becomes engaged with the pin 1 as shown in FIG. 5. The end portion 9 of the pin is disposed within the slot and the fabric is engaged around the U-shaped bend 10 so that it is virtually impossible to remove the fabric from the pin without depressing the arm 2.

In FIGS. 6 to 8 there is disclosed another embodiment of the invention wherein a clip comprising resilient arms 14 and 15 is shown, the pin which may be made of a separate piece of wire secured to one of the resilient arms, having a plurality of bent portions 16 and 17 to form a sinusoidal configuration. In FIG. 7 the arms 14 and 15 are shown as pressed together so as to expose the pin for engagement with the fabric. The fabric is drawn over the portions 16 and 17 and is locked in engagement with the clip when the arms are released in a manner similar to the FIGS. 1 to 5 embodiment. It is apparent that the entire clip may be made of wire as shown in my prior Patent No. 3,049,770 issued August 21, 1962.

In FIG. 9 there is shown a clip 15 which is applied to the rear face of a button 16. Since the cross-guard of the embodiments disclosed in the prior applications hereinbefore referred to are eliminated, the clip may be made shorter and consequently may fit upon the rear face of conventional size buttons. Thus, buttons may be attached to garments without the use of thread and the clip provides a secure attachment to the fabric.

It can be readily appreciated that the location on the pin of the bent portion is of great importance. It is not desirable to bend the outer end of the pin as the outer end cannot be subjected to the substantial stress incurred when the pin is engaged with the fabric. Thus, it is desirable that the bent or locking portion of the pin be located at an intermediate point on the pin. The degree of locking may, to some extent, be controlled by the location on the pin of this bent portion. Furthermore, it is readily apparent that the degree of locking may also be controlled by the disposition of the pin with respect to the slot when the parts are in a normal position. That is to say, with the end portion 9 of the pin in the FIG. 2 position a greater degree of locking will be provided than when the pin is disposed in alignment or even slightly above the slot 12 in the arm 2. Similarly, by providing a lesser or greater degree of bend 10 in the pin, a greater or lesser degree of locking may be achieved.

Obviously many modifications and variations of the present invention are possible in light of the above teachings.

What is claimed as new and desired to be secured by Letters Patent is:

A safety clip comprising, in combination, a pair of arms resiliently interconnected, a slot formed in one of said arms, a pin integrally formed from one of said arms and normally disposed in said slot, said pin having the free end portion adapted to extend through the slot when said pair of arms is brought together, said pin adapted to engage fabric when the pin is extended through the slot and the engaged fabric being drawn through the slot in said arm when the arms are released, locking means on said pin comprising a bent portion of the pin disposed intermediate the ends of the pin, said bent portion comprising a generally upwardly opening U shape with the downwardly bent intermediate part being disposed within the slot of said one arm when the clip is in the normal position thereof, said downwardly bent part being disposed between upwardly bent portions extending above the slot in said one arm, said downwardly bent part locking fabric in engagement with said clip.

References Cited in the file of this patent

UNITED STATES PATENTS

| | | |
|---|---|---|
| 402,685 | Moore | May 7, 1889 |
| 482,257 | Larkin | Sept. 6, 1892 |
| 581,868 | Mullane | May 4, 1897 |
| 591,835 | Gosewisch | Oct. 19, 1897 |
| 697,936 | Dunham | Apr. 15, 1902 |
| 1,184,055 | Uto | May 23, 1916 |
| 1,590,415 | Bragg | June 29, 1926 |
| 2,788,556 | Hanson | Apr. 16, 1957 |
| 3,049,770 | Moghadam | Aug. 21, 1962 |